United States Patent [19]

Brueckner et al.

[11] Patent Number: 5,129,284
[45] Date of Patent: Jul. 14, 1992

[54] RADIAL COMPRESSOR ROTOR WITH IMBALANCE COMPENSATION

[75] Inventors: Gerhard Brueckner, Munich; Bernhard Woehrl, Gauting; Harald Sassmannshausen, Fuerstenfeldbruck, all of Fed. Rep. of Germany

[73] Assignee: MTU Motoren- und Turbinen-Union Muenchen GmbH, Munich, Fed. Rep. of Germany

[21] Appl. No.: 557,534

[22] Filed: Jul. 23, 1990

[30] Foreign Application Priority Data

Jul. 26, 1989 [DE] Fed. Rep. of Germany ....... 3924715

[51] Int. Cl.$^5$ .................. F16F 15/22; B63H 1/00
[52] U.S. Cl. ...................... 74/73 R; 74/572; 416/144
[58] Field of Search .............. 74/572, 574; 416/144, 416/145

[56] References Cited

U.S. PATENT DOCUMENTS

| | | |
|---|---|---|
| 3,323,597 | 6/1967 | Longobardi et al. ............... 416/144 |
| 3,586,460 | 6/1971 | Toner ................................ 416/144 |
| 4,316,700 | 2/1982 | Schramm ...................... 416/144 X |
| 4,644,201 | 2/1987 | Tani et al. ...................... 74/573 R X |
| 4,767,233 | 8/1988 | Erickson ........................ 74/572 X |
| 5,033,923 | 7/1991 | Osawa ........................... 74/573 R |

FOREIGN PATENT DOCUMENTS

| | | | |
|---|---|---|---|
| 0060804 | 5/1981 | Japan ........................... 416/144 |
| 2119063 | 11/1983 | United Kingdom .......... 74/573 R |

*Primary Examiner*—Vinh T. Luong
*Attorney, Agent, or Firm*—W. G. Fasse

[57] ABSTRACT

A radial compressor rotor, especially for static imbalance of a dual flow radial compressor impeller, having back-to-back blades in a gas turbine engine, is provided with at least one axial through hole in the rotor hub. The axial hole is filled in by an imbalance compensating insert which covers the ends of the hole between neighboring radial blade contour surfaces in an aerodynamically flush manner. The density and density distribution of the material of the insert is selected relative to the density and mass concentration of the material of the compressor impeller to achieve the desired imbalance compensating effect.

12 Claims, 2 Drawing Sheets

RADIAL COMPRESSOR ROTOR WITH IMBALANCE COMPENSATION

FIELD OF THE INVENTION

The invention relates to a radial compressor rotor with an imbalance compensation, especially for compensating static imbalances in a dual flow radial compressor impeller of a gas turbine engine, or of a turbocharger by means of one or more inserts arranged in axial bores in the rotor wheel.

BACKGROUND INFORMATION

In typical conventional radial compressor impellers, especially of the so-called dual flow type wherein integrally formed radial impeller blades are arranged back-to-back, or on two sides of one impeller component, it is practically impossible to compensate or balance impeller imbalances by means of local removal or addition of material in a manner avoiding any aerodynamic impairment of the blade profiles and canal structures, which have been precisely produced according to stringent production criteria.

In such a rotor concept the dual flow or double suction radial impeller is welded together or formed as one integral unit including front and rear shaft stubs in order to satisfy the necessary stiffness and the strength requirements despite the sharply tapered or narrow contour of the rotor components sloping inwardly toward the rotor axis. The radially relatively narrow portions of the circumferential rotor contour in conjunction with a relatively long component length, have their cause among others in that relatively high mass throughputs and high inflow velocities into the dual flow radial impeller must be satisfied by the compressor even if the compressor has relatively small given local rotor diameters. Due to the just described construction balancing, even by so-called balancing collars, cannot be realized. Such a so-called balancing collar is a circumferential material web which may be machined away from the inside to compensate imbalances, whereby the collar would be located in the material of the dual flow impeller on the front side or back side thereof, if there were space. Thus, at best, such collars could perhaps be realized as attachment impellers, removably seated on the shaft. However, such balance impellers would require relatively large rotor diameters and they would have to be placed on both sides of the dual flow compressor impeller. Besides, a removable attachment impeller is often not desirable, because it weakens the rotor. However, in such a concept a balancing collar type circumferential flange or the like could be covered by a respective attachment impeller in a flow dynamically smooth manner. Only dynamic local imbalances could be corrected in such a described rotor having a dual flow compressor impeller with integrally formed or attached shaft stubs, in that a local material removal or machining is carried out at the respective bearing area on the shaft stubs. However, such a material removal cannot influence or correct any static imbalances of the dual flow impeller which has the largest rotor mass.

OBJECTS OF THE INVENTION

In view of the above it is the aim of the invention to achieve the following objects singly or in combination:

- to balance imbalances or unbalances in a dual flow rotor having a radial impeller with back-to-back blades;
- to achieve such a balancing, especially for static impeller disk imbalances or remainder or residual imbalances;
- the balancing is to be accomplished in a simple manner, especially also for rotors having pronounced diameter reduction zones, and without any appreciable flow dynamic or strength impairment of the rotor;
- to avoid disturbing the prescribed characteristic frequency of a compressor impeller blade while compensating any imbalance; and
- to provide a method and apparatus for the efficient balancing of gas turbine engine rotors and turbocharger turbine rotors.

SUMMARY OF THE INVENTION

The above objects have been achieve in a method according to the invention, wherein one or more holes are bored axially through an impeller disk and one or more inserts are inserted into the respective axial holes. The density of the material of the inserts is greater than or less than the density of the impeller disk material so as to achieve a relocation of the center of gravity of the impeller disk, whereby the center of gravity of an imbalanced impeller disk is moved into coaxial alignment with the impeller's axis of rotation, to achieve the desired balancing.

The above objects have been achieved in an apparatus according to the invention for carrying out the method described above. In the apparatus according to the invention insert means fill one or more axial through holes between neighboring radial rotor blade members, and wherein the insert means are made of carbon fiber, glass fiber, or ceramic fiber reinforced synthetic material having the same or at least a similar thermal expansion property as the material of the rotor itself, and the density of the insert material is selected so that it differs from that of the rotor material. The location of the respective axial holes is selected for shifting the center of gravity of an unbalanced impeller rotor into alignment with the axis of rotation of the rotor to properly balance the rotor. The insert may include a hollow cavity which may be filled with other materials, such as lead-shot, lead rolled cylinders, or poured-in lead. The bored hole may be conically tapered from each end toward a narrower middle section, or may include a middle section of increased diameter in order to seat the insert and prevent the insert from sliding out of the axial hole during operation of the rotor. Furthermore, each insert may be made up of at least two separate components which are interconnected, e.g. screwed together to become tightly wedged into the axially bored hole.

In this manner the invention avoids the disadvantages which are common in known methods of residual imbalance compensation in the turbo-charger technology. Such known compensation methods entail the removal of material from the rotor blade surfaces at their leading edges on the impeller disk. The material removal is no longer practically feasible in view of the required high compression ratios and because material removal has an impairing effect on the blade surfaces. A further disadvantage is caused by the known material removal in that it changes the characteristic frequency or eigenfrequency of a blade. The eigenfrequency has been pre-tuned according to operational characteristic requirements and should not be altered or disturbed by any imbalance correcting measures.

The invention achieves a flow dynamic or aerodynamic flush closure of any axial holes. Thus, the flow channel walls in the impeller disk remain smooth. The inserts, according to the invention, could also be described as flush closure plugs for closing axial holes. Thus, in the simplest manner, any imbalance, such as a static residual imbalance, may, for example, be balanced by boring an axial hole at the location of the greatest eccentric mass of the impeller disk and then filling the bored hole and flush-closing the ends of the hole with an insert according to the invention of which the density is considerably less than the density of the material removed by boring the hole.

Preferably, however, a plurality of axial holes may be uniformly provided at a certain radius and distributed about the circumference in each mass-produced rotor or impeller, whereby all of the holes are to be closed or sealed with inserts according to the invention. In this context the respective density of each insert must be selected to achieve an appropriate contribution to the compensation of any residual imbalance by using inserts having different densities in different axial holes around the circumference of the rotor.

Centrifugal forces occurring during operation of the rotor, are directed perpendicularly to the axis of each bored axial hole. Thus, it is generally not to be expected that the inserts or closure elements are spun out of their repective holes. This is especially true when the axial holes have a relatively long axial length and hence a relatively long supporting or reactive length in the radial direction.

In structural embodiments of the invention, means are provided for axially securing the inserts. Each insert may be locally glued in, or a press-fit in the respective axial hole may be used. If the operational speed and resulting centrifugal forces are deemed to be excessive for such securing means, the invention provides for tapered or collared axial holes for holding each insert in its place.

Generally, when an insert is prepared according to the invention with a material filling, such as lead-shot, the filling which makes up most of the mass of the insert, should be located approximately near the middle plane of the impeller disk. Such location of the major mass of the insert ensures that the insert will be well supported against radially acting centrifugal forces by a thick and strong material portion of the impeller disk through which the hole passes. However, in some cases it may be desirable to provide an insert of which the center of gravity does not lie on the central radial plane of the impeller disk, but rather is axially displaced therefrom in order to compensate any axially shifted imbalances of the impeller disk or rotor.

In the mass-production of dual flow impellers, it is convenient to provide each impeller with a plurality of axial holes uniformly distributed about the circumference, and to keep on hand a series of premade plastic inserts or plugs to be inserted as required. Several different insert types would be kept on hand, each having a different weight or density, depending on the respective operating conditions or requirements. In the balancing procedure, the imbalance of an impeller disk could be measured and entered into a computer which would select the appropriate inserts which may then automatically be glued or press-fit into the corresponding axial holes.

It is possible, according to the invention, to make the inserts heavier, lighter, or the same weight or density, as the corresponding rotor or disk material and then, for example, to select an appropriate mixed distribution pattern of inserts having different densities in order to compensate different imbalance patterns.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
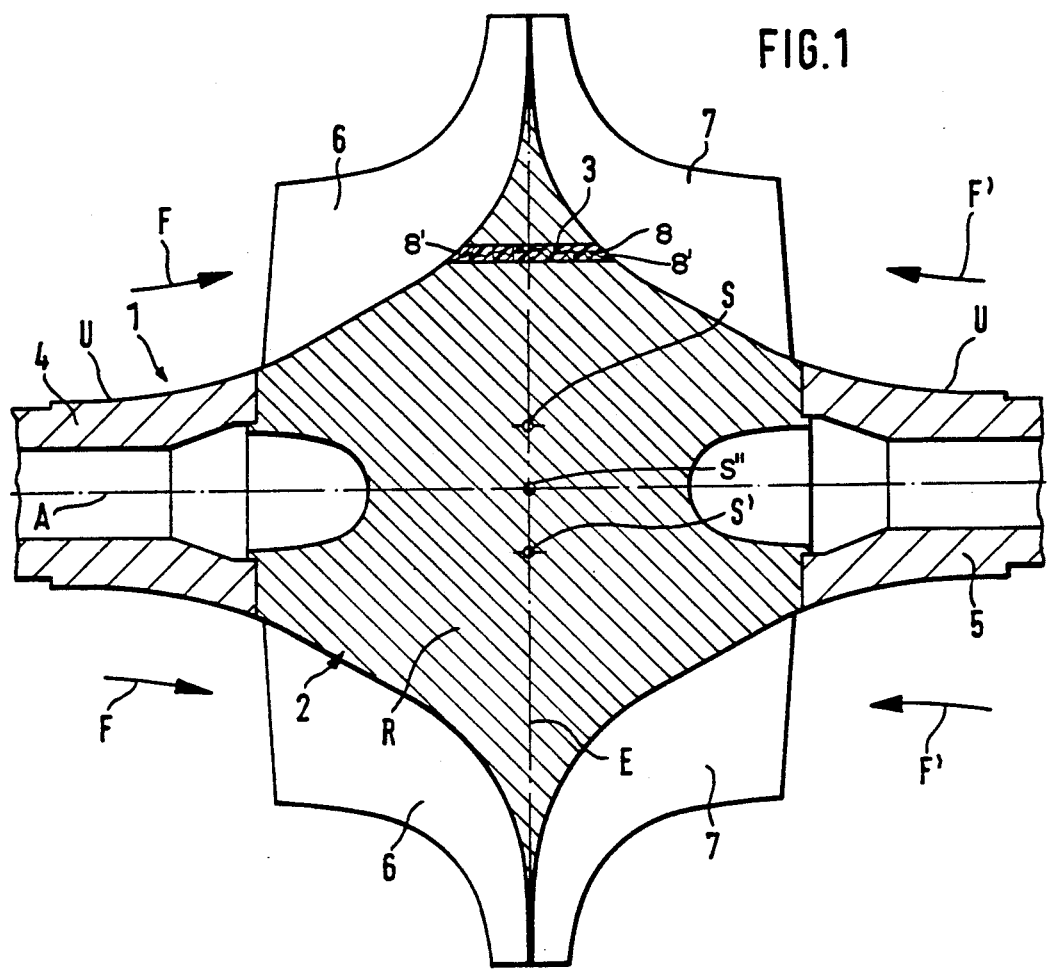
FIG. 1 is a central lengthwise section through a partial rotor of a radial compressor broken off at the shaft stubs and having a dual flow radial compressor impeller with a back-to-back blade arrangement.

FIG. 1 shows the position of an axial bore 3 with a balancing insert 8 for compensating an imbalance in a radial compressor rotor 1, especially for compensating static imbalances in a dual flow radial compressor impeller 2 with back-to-back impeller blades 6 and 7 for a gas turbine engine. The ends 8' of the insert 8 are flush with the blade surfaces. For this dual flow compressor rotor 1, the gas flow to be compressed approaches the impeller 2 from two sides as indicated by the arrows F and F'. The gas flow comes from further radial impellers not shown. The compressor impeller 2 comprises an impeller disk R with at least one of said axial bores 3 passing entirely through the outer circumferential area of the impeller disk R. The insert 8 fills the axial hole 3 completely and the insert ends 8' cover the ends of the hole 3 in an aerodynamically flush manner so that the surface or contour U of both rotor blades remains undisturbed by the insert or plug 8. As shown in FIG. 1, the center of gravity of the compressor impeller 2 before the axial hole 3 was bored, was located at S, and not centrally on the axis of rotation A, thereby causing an imbalance. The insert 8 filling the axial hole 3 is made of a rather light plastic material, so as to achieve an imbalance compensating effect by shifting the center of gravity from point S back to point S" along the axis of rotation A.

Assuming a center of gravity S' as shown in FIG. 1, which is displaced by 180° relative to the center S, a respective compensation would be possible by providing an insert 8 in the same bore 3, but with a material density greater than the density of the material of the impeller disk R. Thus, the center of gravity of the compressor impeller 2 is also shifted back to the center of gravity S'', thereby compensating the original imbalance. Thus, by selecting an insert 8 having an appropriate material density, any imbalanced center of gravity, for example, S or S' lying along the line E may be corrected or compensated by shifting the center of gravity into the axis of rotation A at point S''.

At its axial ends, rotor 1 further comprises shaft stubs 4 and 5 which, for example, are welded to the impeller disk R. It may further be assumed that additional radial impellers not shown in FIG. 1, are mounted on the respective ends of the shaft stubs 4 and 5, for supplying precompressed air in the direction of arrows F and F' to the dual flow radial compressor impeller 2 with its back-to-back blades 6 and 7 which have a continuous radially outward taper in the gas flow direction. Highly compressed air is directed with a relatively high flow discharge velocity from the impeller blades 6 and 7 into a diffuser system not shown, from which the compressed air is then directed into a combustion chamber of a gas turbine engine, for example.

As can be seen in FIG. 1, each of the shaft stubs 4 and 5 has an outer circumferential contour U which is relatively narrow or pinched-in toward the rotor axis A. The contour U extends in a continuous smooth surface over the hub side of the impeller disk R and over the exposed ends 8' of the insert 8, whereby a continuous aerodynamically smooth surface flow channel is formed. In this arrangement, one or more axial through-going bores 3 for receiving the corresponding inserts 8, extend axially through the impeller disk R between two neighboring radial compressor blades 6 and 7, which in turn are arranged at a respective uniform spacing from one another around the circumference of the impeller disk. As mentioned, the insert 8, for example made of plastic material, comprises either a lower, or a higher specific weight or density than the material of the impeller disk R to achieve the above described shifting of an imbalanced rotor center of gravity S or S' to a balanced center of gravity S'' on the rotor axis A. Furthermore, it is important for operating safety, that the insert 8, in any case, comprises a thermal expansion coefficient which is equal or at least similar to that of the material of the impeller disk R. The inserts 8 may therefore, for example, be made of plastic material as a unitary or as a multi-piece component. Furthermore, it is possible, according to the invention, to make the inserts 8 out of synthetic material reinforced with carbon fibers, glass fibers, or ceramic fibers.

It is further provided, according to the invention, that the insert or inserts 8 are made of fibers of the above described type embedded in a synthetic resin matrix, for example, a thermoplastic or polyimide matrix, or may include combinations of the above mentioned fibers. Depending on the choice of the fiber types and on the fiber directions or fiber orientation, the thermal expansion coefficients of the inserts 8 can be tuned or matched to the thermal expansion coefficients of the impeller disk R to achieve the most uniform operational expansion that is possible.

By utilizing predetermined winding directions of the fibers or fiber combinations, the inserts 8 may be circumferentially strengthened to withstand relatively large centrifugal forces acting on the inserts 8. Generally it is desirable that the inserts 8 should not be deformed at all or be only minimally deformed by centrifugal forces during operation of the impeller.

Figure 2:
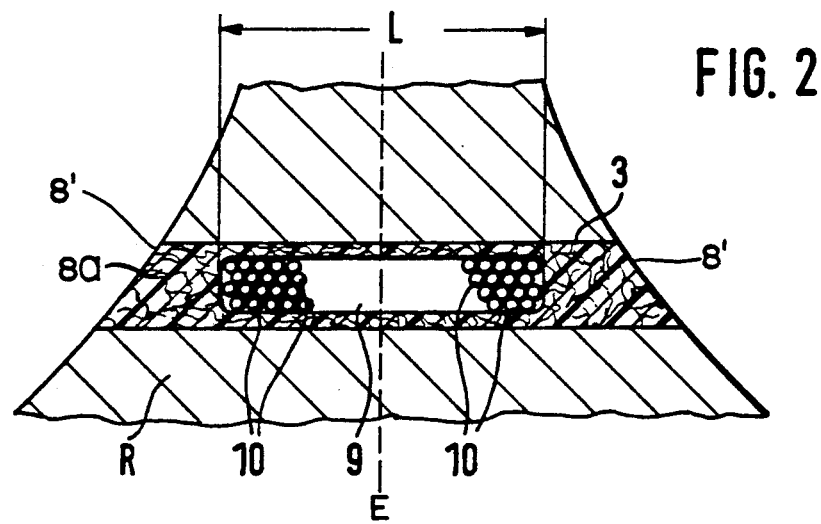
FIG. 2 is a radial section through an outer portion of a radial compressor impeller on an enlarged scale, showing the upper portion of FIG. 1, including a plastic insert having a lead-shot filling for locally compensating an imbalance.

FIG. 2 shows the flush surfaces 8' of an insert 8a in the axial hole 3, wherein the insert 8a is made of a synthetic material with a cavity 9 filled with lead, e.g. lead-shot 10. The lead-shot 10 may also be embedded in the synthetic material of the insert. Depending on the imbalance compensation requirements, the structural length L of the cylindrical cavity 9 of the insert 8 can be varied in order to receive a smaller or larger material filling of lead-shot 10. Furthermore, it is possible that the axial structural length L of the cavity 9 is not centered relative to a radial center line E of the impeller disk R, so that the resulting weight distribution of lead-shot 10 can compensate imbalances which are not uniformly axially distributed relative to the line of symmetry E. Thus, the cavity 9 may be longer on one side of the line E or vice versa.

In an alternative embodiment not specifically shown, but represented by FIG. 2, the unbalance compensating material in the cavity 9 of the insert 8, comprises a lead filling which is poured into the cavity 9, or comprises a cylinder of lead formed by rolling a lead sheet or by hammering lead into the chamber.

Figure 3:
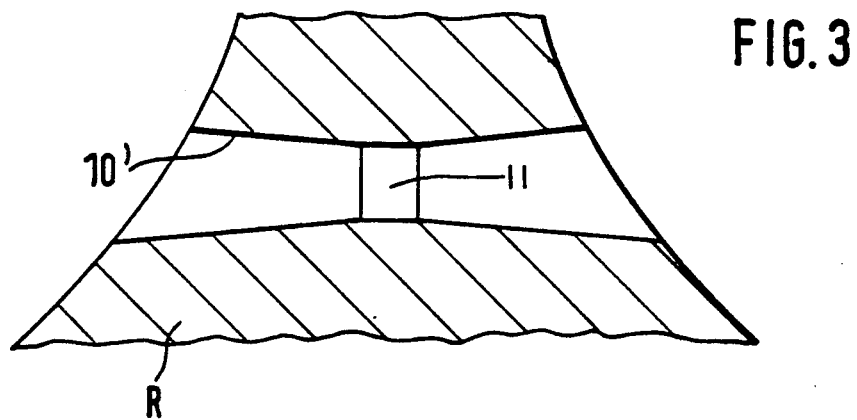
FIG. 3 is a radial partial section similar to the one of FIG. 2, but showing a spindle-shaped multi-tapered axial bore hole for receiving an insert, but without showing the insert.
Figure 4:
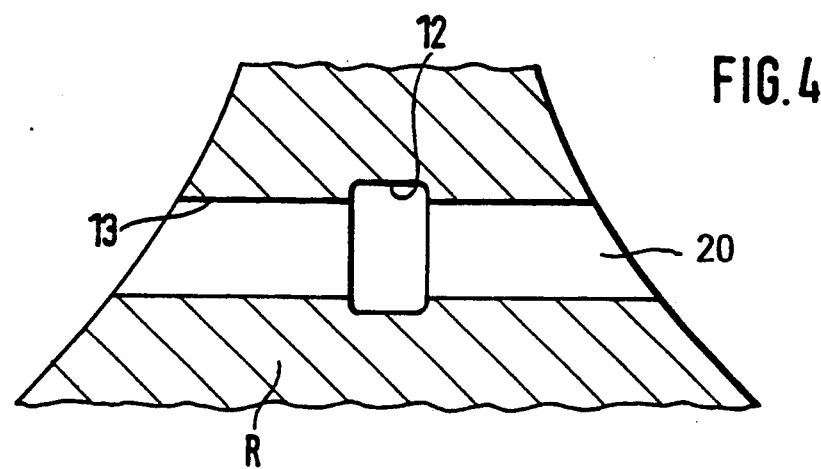
FIG. 4 is a radial partial section similar to the one of FIG. 3, but showing an axial hole, including a wider annular groove at its center for receiving and locking an insert.

Generally, the insert 8, 8a may be glued into the corresponding axial hole 3. If gluing is deemed insufficient to hold the insert in its hole under the effect of any arising centrifugal forces, various mechanical holding means may be provided as shown by FIGS. 3 and 4. Without showing the corresponding insert, FIG. 3 illustrates a spindle-shaped axial hole 10' through the impeller disk R. The hole 10' has a double-conical tapered shape becoming narrower inwardly from each end of the hole 10' converging toward a central neck portion 11. Rather than converging inwardly, the hole may also have inwardly diverging hole sections. Alternatively, according to FIG. 4, an axial hole 13 comprises an inner groove 12 having a greater diameter. In any of these embodiments an appropriately shaped insert of synthetic fiber reinforced material is forced into the axial hole prior to curing of the matrix material. After curing, the insert or plug is solidly held in place in its hole. In FIG. 4 a plug 20 of solidified lead is shown for example.

Figure 5:
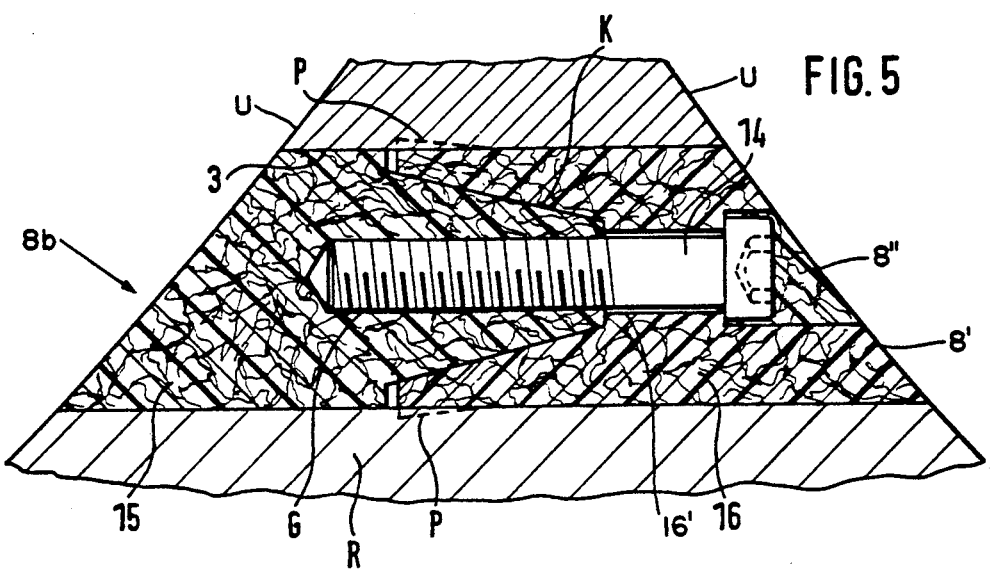
FIG. 5 is a radial partial section of an outer portion of a radial compressor impeller, similar to the view of FIG. 2, but showing a two-part insert clamped into place in an axial hole by means of a conically clamping screw connection.

According to FIG. 5, an insert 8b comprises two insert sections 15 and 16 each having an outer flush surface 8'. The insert sections 15 and 16 comprise respective conical mating surfaces K and are clamped together by a screw 14 so as to press expansion surfaces P of the section 16 radially outwardly against the cylindrical walls of the hole 3 in a counter-wedged clamping fashion. The screw 14 passes freely through the hole 16' in the section 16 and is threaded into a threading G of the other section 15. Basically, both sections 15 and 16 can be made of the same material having the same specific weight or density. Both sections 15 and 16 could, for example, be made of a suitable synthetic fiber reinforced material, while the screw 14 may be made of a metallic material, whereby the screw 14 would comprise the greater portion of the mass relative to the two sections 15 and 16 so that the screw 14 would provide the major imbalance compensating effect. The cavity 8'' is filled with a curable or cured synthetic material to restore a smooth transition across the entire end surface 8' and thus of the flow contour U.

Depending upon the conditions and requirements of any particular application or use, it is also possible to make the insert sections 15 and 16 of respectively different materials having different specific weights or densities. Such a construction would be useful in order to compensate eccentric mass or residual imbalances of the rotor or the impeller disk R, that is to say, compensate imbalances which are not uniformly distributed in an axial direction.

For all of the above described embodiments and configurations of balancing mass inserts, each impeller disk may be mass-produced with axial through-going holes uniformly distributed around a circle 21 at one or more radii. All of the holes need then be filled in by respective inserts or plugs of which the respective densities are selected in an appropriate distribution to achieve a compensation of any imbalance. When using axial holes of a blind or one-sided type, the holes should be as deep or as axially long as possible in order to prevent the respective insert from being spun out of the hole due to arising centrifugal loads.

Although the invention has been described especially for use in compressor rotors of gas turbine engines, it is also applicable to radial compressor rotors of turbochargers.

Although the invention has been described with reference to specific example embodiments, it will be appreciated that it is intended to cover all modifications and equivalents within the scope of the appended claims.

What we claim is:

1. A radial compressor rotor having a rotational axis, comprising a dual-flow compressor wheel with back-to-back blades forming respective flow channels, imbalance compensating means in said compressor wheel, said imbalance compensating means comprising at least one axial through bore extending through said rotor in parallel to said rotational axis between neighboring radial blade surfaces of said rotor, said through bore opening in a respective wall surface of said flow channels, at least one insert means in said axial through bore for compensating an imbalance in said radial compressor rotor, said insert means having one end surface in each said wall surface, said end surface being aerodynamically flush with said respective flow channel wall surface, said insert means being made of a synthetic resin matrix material reinforced with fibers selected from the group consisting of carbon fibers, glass fibers, ceramic fibers, and combinations of said fibers, said insert means having a thermal expansion characteristic similar to a thermal expansion coefficient of said rotor, said insert means having a density different from a density of said rotor.

2. The radial compressor rotor of claim 1, wherein said insert means compensate static imbalances.

3. The radial compressor rotor of claim 1, wherein said synthetic resin matrix material is a polyimide synthetic resin.

4. The radial compressor rotor of claim 1, wherein said synthetic resin matrix is a thermoplastic material selected from the group consisting of epoxide resins and polyimide resins.

5. The radial compressor rotor of claim 1, wherein said insert means further comprises a material filling mass which determines the density of said insert means.

6. The radial compressor rotor of claim 5, wherein said material filling mass comprises lead-shot.

7. The radial compressor rotor of claim 5, wherein said material filling mass comprises solid lead.

8. The radial compressor rotor of claim 5, wherein said material filling mass comprises a lead member formed of rolled lead sheet.

9. The radial compressor rotor of claim 1, wherein said axial hole has a dual-conical axial sectional shape, and wherein said insert means comprises a mating dual-conical shape.

10. The radial compressor rotor of claim 1, wherein said axial hole comprises a bored hole having a first smaller diameter and a groove having a second larger diameter, and wherein said insert means have a corresponding shape comprising a collar fitting into said groove.

11. The radial compressor rotor of claim 1, wherein said imbalance compensating insert means comprise two insert sections (15, 16) having an outer surface (8') flush with said flow channel wall surface, said insert sections comprising respective conical mating surfaces (K), a screw (14) passing through said insert sections for holding said sections in place in said axial through bore.

12. The radial compressor rotor of claim 11, wherein one of said insert sections has a cavity (8") in which a head of said screw is recessed, and wherein said cavity is filled with a cured synthetic material.

* * * * *